US012718105B2

(12) United States Patent
Piyasena et al.

(10) Patent No.: US 12,718,105 B2
(45) Date of Patent: Aug. 25, 2026

(54) CONTINUAL LEARNING METHODS AND SYSTEMS

(71) Applicant: NANYANG TECHNOLOGICAL UNIVERSITY, Singapore (SG)

(72) Inventors: Gane Pathirannahelage Duvindu Piyasena, Singapore (SG); Siew Kei Lam, Singapore (SG); Meiqing Wu, Singapore (SG)

(73) Assignee: NANYANG TECHNOLOGICAL UNIVERSITY, Singapore (SG)

(*) Notice: Subject to any disclaimer, the term of this patent is extended or adjusted under 35 U.S.C. 154(b) by 461 days.

(21) Appl. No.: 18/283,761

(22) PCT Filed: Apr. 21, 2022

(86) PCT No.: PCT/SG2022/050237

§ 371 (c)(1), (2) Date: Sep. 22, 2023

(87) PCT Pub. No.: WO2022/225461

PCT Pub. Date: Oct. 27, 2022

(65) Prior Publication Data

US 2024/0169205 A1 May 23, 2024

(30) Foreign Application Priority Data

Apr. 22, 2021 (SG) .......................... 10202104113Q

(51) Int. Cl.
*G06N 3/084* (2023.01)

(52) U.S. Cl.
CPC .................................. *G06N 3/084* (2013.01)

(58) Field of Classification Search
CPC .......... G06N 3/084; G06N 3/063; G06N 3/08; G06N 3/0464
See application file for complete search history.

(56) References Cited

U.S. PATENT DOCUMENTS

| | | | | |
|---|---|---|---|---|
| 10,635,947 | B2 | 4/2020 | Chen et al. | |
| 2018/0165554 | A1* | 6/2018 | Zhang .................. | G06N 20/10 |

(Continued)

OTHER PUBLICATIONS

Khan, Z., Lehtomäki, J., Shahid, A., & Moerman, I. (Jul. 2020). Real-time edge analytics and concept drift computation for efficient deep learning from spectrum data. In IEEE Infocom 2020—IEEE Conference on Computer Communications Workshops (Infocom Wkshps) (pp. 1290-1291). IEEE. (Year: 2020).*

(Continued)

*Primary Examiner* — John S. Wasaff

(74) *Attorney, Agent, or Firm* — HARNESS, DICKEY & PIERCE, P.L.C.

(57) ABSTRACT

A continual learning method, comprising: obtaining, for each of a plurality of classes, a mean of each of a plurality of features generated by passing a plurality of training samples to a pre-trained convolutional neural network, and a covariance matrix of the plurality of features, wherein each of the training samples belongs to one of the classes; obtaining extracted features from the pre-trained convolutional neural network for an additional training sample belonging to a class of said classes; generating a centred feature vector using the mean for the class and the extracted features; updating, using the centred feature vector and the covariance matrix, the covariance matrix, wherein said updating is performed for diagonal elements of the covariance matrix but not for off-diagonal elements; updating the mean for the class using the extracted features; and outputting, based on the updated mean and updated covariance matrix, weights of a streaming linear discriminant analysis (SLDA) model.

12 Claims, 10 Drawing Sheets

(56) References Cited

U.S. PATENT DOCUMENTS

| | | | | |
|---|---|---|---|---|
| 2019/0043488 | A1* | 2/2019 | Bocklet | G10L 15/16 |
| 2020/0104630 | A1 | 4/2020 | Chen et al. | |
| 2020/0125639 | A1* | 4/2020 | Doyle | G06N 3/08 |
| 2020/0125928 | A1* | 4/2020 | Doyle | G06N 3/08 |
| 2020/0126533 | A1* | 4/2020 | Doyle | G06F 40/30 |

OTHER PUBLICATIONS

LeCun, Yann, "1.1 Deep Learning Harware: Past Present and Future", ISSCC 2019, Session 1, Prenary 1.1, Feb. 18, 2019. pp. 12-19.

Shawahna, Ahmad et al. "FPGA-Based Accelerators of Deep Learning Networks for Learning and Classification: A Review", IEEE Access, Dec. 28, 2018, pp. 7823-7859.

Nurvitadhi, Eriko et al. "Can FPGAs Beat GPUs in Accelerating Next-Generation Deep Neural Networks?", Intel Corporation, Feb. 22-24, 2017, pp. 5-14.

Jouppi, Norman P. et al., "In-Datacenter Performance Analysis of a Tensor Processing Unit", Google, Inc., Jun. 24-28, 2017, 12 pages.

Parisi, German I. et al.. "Continual lifelong learning with neural networks: A review", Neural Networks, Jan. 22, 2019, pp. 54-71.

Lesort, Timothée et al., "Continual Learning of Robotics: Definition, Framework, Learning Strategies, Opportunities and Challenges", Elsevier, Dec. 10, 2019., pp. 52-68.

De Lange, Matthias et al., "A continual learning survey: Defying forgetting in classifications tasks", IEEE Explore, pp. 3366-3385.

Hadsell, Raia et al., "Embracing Change: Continual Learning in Deep Neural", CellPress Reviews, Dec. 2020, pp. 1028-1040.

Kirkpatrick, James et al., "Overcoming catastrophic forgetting in neural networks", Proceedings of The National Academy of Science, Jan. 25, 2017, pp. 1-13.

Zenke, Friedemann et al., "Continual Learning Through Synaptic Intelligence", ResearchGate, Apr. 10, 2017, 10 pages.

Li, Zhizhong et al., "Learning without Forgetting", IEEE Transactions on Pattern Analysis and Machine Intelligence, Feb. 14, 2017, pp. 1-13.

Rusu, Andrei et al., "Progressive Neural Networks", Google DeepMind, arXiv preprint arXiv: 1606.04671, 2016, 14 pages.

Yoon, Jaehong et al., "Lifelong Learning With Dynamically Expandable Networks." ICLR, 2018, 11 pages.

Parisi, German I. et al., "Lifelong Learning of Spatiotemporal Representations With Dual-Memory Recurrent Self-Organization", Frontiers in Neurobotics, Nov. 2018, vol. 12, Article 78, pp. 1-19.

Kemker, Ronald et al., "FearNet: Brain-Inspired Model for Incremental Learning", ICLR, 2018, pp. 1-16.

Gepperth, Alexander et al., "A Bio-Inspired Incremental Learning Architecture for Applied Perceptual Problems", CrossMark, 2016, pp. 924-934.

Rebuffi, Sylvestre-Alvise, "iCaRL Incremental Classifier and Representation Learning", IEEE Conference on Computer Vision and Pattern Recognition, 2017, pp. 5533-5542.

Hayes, Tyler I., "Memory Efficient Experience Replay for Streaming Learning", ICRA, May 20-24, 2019, pp. 9679-9776.

Lopez-Paz, David et al., "Gradient Episodic Memory for Continual Learning", Facebook Artificial Intelligence Research, Sep. 13, 2022, pp. 1-17.

Chaudhry, Arslan et al., "Efficient Lifelong Learning with A-GEM", ICLR, Jan. 9, 2019, pp. 1-20.

Geng, Tong et al., "FPDeep: Acceleration and Load Balancing of CNN Training on FPGA Clusters", IEEE 26th Annual International Symposium on Field-Programmable Custom Computing Machines, 2018, pp. 81-84.

Zhao, Wenlai et al., "F-CNN: An FPGA-based Framework for Training Convolutional Neural Networks", IEEE, 2016, pp. 107-114.

Piyasena, Duvindu et al., "Dynamically Growing Neural Network Architure for Lifelong Deep Learning on the Edge", 30th International Conference on Field-Programmable Logic and Applications (FPL), 2020, pp. 262-268.

Hacene, Ghouthi Boukli et al., "Budget Restricted Incremental Learning with Pre-Trained Convolutional Neural Networks and Binary Associative Memories", IMT, May 2017, 6 pages.

Hacene, Gouthi B. et al., "Efficient Hardware Implementation of Incremental Learning and Inference on Chip", IEEE Xplore, Dec. 28, 2018, 4 pages.

Jégou, Hervé et al., "Product Quantization for Nearest Search," IEEE Transactions on Pattern Analysis and Machine Intelligence, Mar. 23, 2011, 15 pages.

Belouadah, Eden et al., "A Comprehensive Study of Class Incremental Learning Algrorithms for Visual Tasks", Neural Networks, vol. 135 (2021), pp. 38-54.

Deng, Jia et al., "ImageNet: A Large-Scale Hierarchical Image Database." IEEE, 2009, pp. 248-255.

Razavian, Ali Sharif et al., "CNN Features off-the-shelf: an Astounding Baseline for Recognition", Computer Vision Foundation, IEEE Xplore, 2014, pp. 806-813.

He, Kaiming et al., "Deep Residual Learning for Image Recognition", Microsoft, Dec. 10, 2015, pp. 1-12.

Sze, Vivienne et al., "Efficient Processing of Deep Neural Networks: A Tutorial and Survey", Contributed Paper, Dec. 2017, pp. 2295-2329.

Horowitz, Mark, "Computing's Energy Problem: (and what we can do about it)", IEEE International Solid-State Circuits Conference, Feb. 10, 2014, pp. 10-14.

Lomonaco, Vincenzo et al., "CORe50: a New Dataset and Benchmark for Continuous Object Recognition", Department of Computer Science and Engineering—DISI, May 9, 2017, pp. 1-13.

Paszke, Adam et al., "PyTorch: An Imperative Style, High-Performance Deep Learning Library", NeurIPS, 2019, pp. 1-12.

T.L. Hayes et al., "Lifelong Machine Learning with Deep Streaming Linear Discriminant Analysis", IEEEICVF Conference on Computer Vision and Pattern Recognition Workshops (CVPRW) 2020, Apr. 17, 2020, pp. 887-896 [Retrieved on May 26, 2022] <DOI: 10.1109/CVPRW50498.2020.00118>.

Spatial, General Matrix Multiple (GeMM), Feb. 16, 2021, [Retrieved on May 26, 2022 from https://spatial-lang.org/gemm].

Nvidia, "Deep Learning Performance Documentation", Sep. 29, 2020, [Retrieved on May 26, 2022 from https://docs.nvidia.com/deeplearning/performance/dl-performance-matrix-multiplication/index.html].

M. Sankaradas et al., "A Massively Parallel Coprocessor for Convolutional Neural Networks", 20th IEEE International Conference on Application-specific Systems, Architectures and Processors 2009, Jul. 9, 2009, pp. 53-60, [Retrieved on May 26, 2022] <DOI: 10.1109/ASAP.2009.25>.

International Search Report issued in PCT/SG2022/050237, mailed Jul. 4, 2022; ISA/SG.

* cited by examiner 3023
402
PE
Scale
din_L1
k
op
0
410
412
414
L2 mem
To PE
404
A0
A1
A2
B0
B1
B2
406
408
C0,0
C0,1
C0,2
C1,0
C1,1
C1,2
C2,0
C2,1
C2,2

CONTINUAL LEARNING METHODS AND SYSTEMS

CROSS-REFERENCE TO RELATED APPLICATIONS

This application is a U.S. National Phase Application under 35 U.S.C. 371 of International Application No. PCT/SG2022/050237, filed on Apr. 21, 2022, which claims the benefit of Singaporean patent application number 10202104113Q, filed on Apr. 22, 2021. The entire disclosures of the above applications are incorporated herein by reference.

TECHNICAL FIELD

The present invention relates, in general terms, to continual learning methods and systems, and more particularly relates to methods and systems of accelerating continual learning on edge FPGA.

BACKGROUND

Field Programmable Gate Arrays (FPGAs) have demonstrated significant success in accelerating Convolutional Neural Networks (CNNs) at the edge, due to their ability to meet real-time performance requirements at extremely high energy efficiency. However, the majority of edge CNN accelerators focus only on the inference task and hence they lack the ability to learn and adapt to dynamic environments. Learning and adaptation is essential in autonomous robots, drones and self-driving cars, where the deep learning models are likely to encounter new scenarios which were not present in the training dataset.

The conventional CNN training based on backpropagation has high computation and memory requirements in comparison to inference. Due to the tight resource constraints on edge accelerators, CNNs are usually trained first on a server, typically on a graphics processing unit (GPU) or a specialized accelerator such as Google tensor processing unit (TPU), and deployed on the edge accelerator for inference. Hence, to continuously accumulate knowledge, the edge accelerator would require constant data transfer and model retrieval from a remote server. This mode of training is ill-suited for applications that require quick adaptation to new knowledge, due to the round-trip communication overhead. Also, the edge device may need to operate offline if constant network connectivity cannot be guaranteed. Additionally, some applications have strict data privacy constraints, where sharing data with a remote server is not possible.

Furthermore, it is extremely challenging for edge devices to learn continuously, as conventional Deep Neural Networks (DNNs) suffer from catastrophic forgetting, a phenomenon where learning new knowledge leads to loss of previous knowledge. As such, they need to be retrained with the entire dataset to add new knowledge, which is slow and requires a large amount of storage on the edge device.

It would be desirable to overcome all or at least one of the above-described problems.

SUMMARY

Disclosed herein is an on-chip system for continual learning, comprising memory and at least one compute unit in communication with the memory. The at least one compute unit is configured to:

- obtain, for each of a plurality of classes, a mean of each of a plurality of features generated by passing a plurality of training samples to a pre-trained convolutional neural network, and a covariance matrix of the plurality of features, wherein each of the training samples belongs to one of the classes;
- obtain extracted features from the pre-trained convolutional neural network for an additional training sample belonging to a class of said classes;
- generate a centred feature vector using the mean for the class and the extracted features;
- update, using the centred feature vector and the covariance matrix, the covariance matrix;
- update the mean for the class using the extracted features; and
- output, based on the updated mean and updated covariance matrix, weights of a streaming linear discriminant analysis (SLDA) model.

In some embodiments, said updating is performed for diagonal elements of the covariance matrix but not for off-diagonal elements.

In some embodiments, the memory is configured to store the mean, covariance matrix, and extracted features using a fixed-point data representation.

In some embodiments, at least one compute unit is an FPGA comprising a general matrix multiplication (GEMM) unit in communication with a vector processing unit (VPU).

In some embodiments, the GEMM unit is configured to update the covariance matrix.

In some embodiments, the GEMM unit comprises an array of processing elements, and the GEMM unit is configurable to be flattened to a single column.

In some embodiments, the memory comprises scratchpad memory for storing the extracted features, the mean, and the weights.

In some embodiments, the scratchpad memory comprises L1 scratchpad memory comprising a plurality of banks split into distinct BRAM units.

In some embodiments, the compute unit is configured to store the mean in a first bank of said plurality of banks, and the extracted features in a second bank of said plurality of banks, during the generation of the centred feature vector; and to store the centred feature vector in a third bank of said plurality of banks.

In some embodiments, the GEMM unit comprises L2 scratchpad memory associated with each of said processing elements, for storing elements of at least part of said covariance matrix.

Disclosed herein is also a continual learning method. The continual learning method comprises:

- obtaining, for each of a plurality of classes, a mean of each of a plurality of features generated by passing a plurality of training samples to a pre-trained convolutional neural network, and a covariance matrix of the plurality of features, wherein each of the training samples belongs to one of the classes;
- obtaining extracted features from the pre-trained convolutional neural network for an additional training sample belonging to a class of said classes;
- generating a centred feature vector using the mean for the class and the extracted features;
- updating, using the centred feature vector and the covariance matrix, the covariance matrix, wherein said updating is performed for diagonal elements of the covariance matrix but not for off-diagonal elements;
- updating the mean for the class using the extracted features; and outputting, based on the updated mean and updated covariance matrix, weights of a streaming linear discriminant analysis (SLDA) model.

Advantageously, embodiments of the invention implement an on-chip continual learning system that combines a novel edge accelerator for SLDA with Xilinx deep learning processing unit (DPU).

Advantageously, the present SLDA has extremely low compute and memory requirements, leading to good accuracy trade-off.

Advantageously, the present on-chip system is highly customisable to facilitate approximate computing, memory organization, on-chip data reuse, and resource sharing to reduce latency, resources and power.

BRIEF DESCRIPTION OF THE DRAWINGS

Embodiments of the present invention will now be described, by way of non-limiting example, with reference to the drawings in which.

DETAILED DESCRIPTION

Real-time edge artificial intelligence (AI) systems operating in dynamic environments must learn quickly from streaming input samples without needing to undergo offline model training. The present invention proposes an FPGA accelerator for continual learning based on streaming linear discriminant analysis (SLDA), which is capable of class-incremental object classification. The proposed SLDA accelerator employs an application-specific parallelism, efficient data reuse, resource sharing, and approximate computing to achieve high performance and power efficiency. Additionally, disclosed herein is a new variant of SLDA, where the SLDA accelerator is combined with a Convolutional Neural Network (CNN).

The proposed edge accelerator can be used for continual learning on FPGA. The basis for the accelerator is a Deep SLDA, where a SLDA classifier performs incremental training at the last layer of a CNN. Under the present continual learning paradigm, the deep learning model can acquire new knowledge continuously while preventing catastrophic forgetting. It will be appreciated that the term lifelong/incremental learning can also be used interchangeably with continual learning, unless context dictates otherwise.

In embodiments of the invention, to deploy the AI models the CNN models are initially trained on a large representative dataset. This knowledge is used to train only the last layer(s) of the CNN model, when learning new classes. In comparison to training the entire model, this strategy is more amenable for edge implementation. This facilitates a full continual learning method implemented in edge computing hardware.

Figure 1:
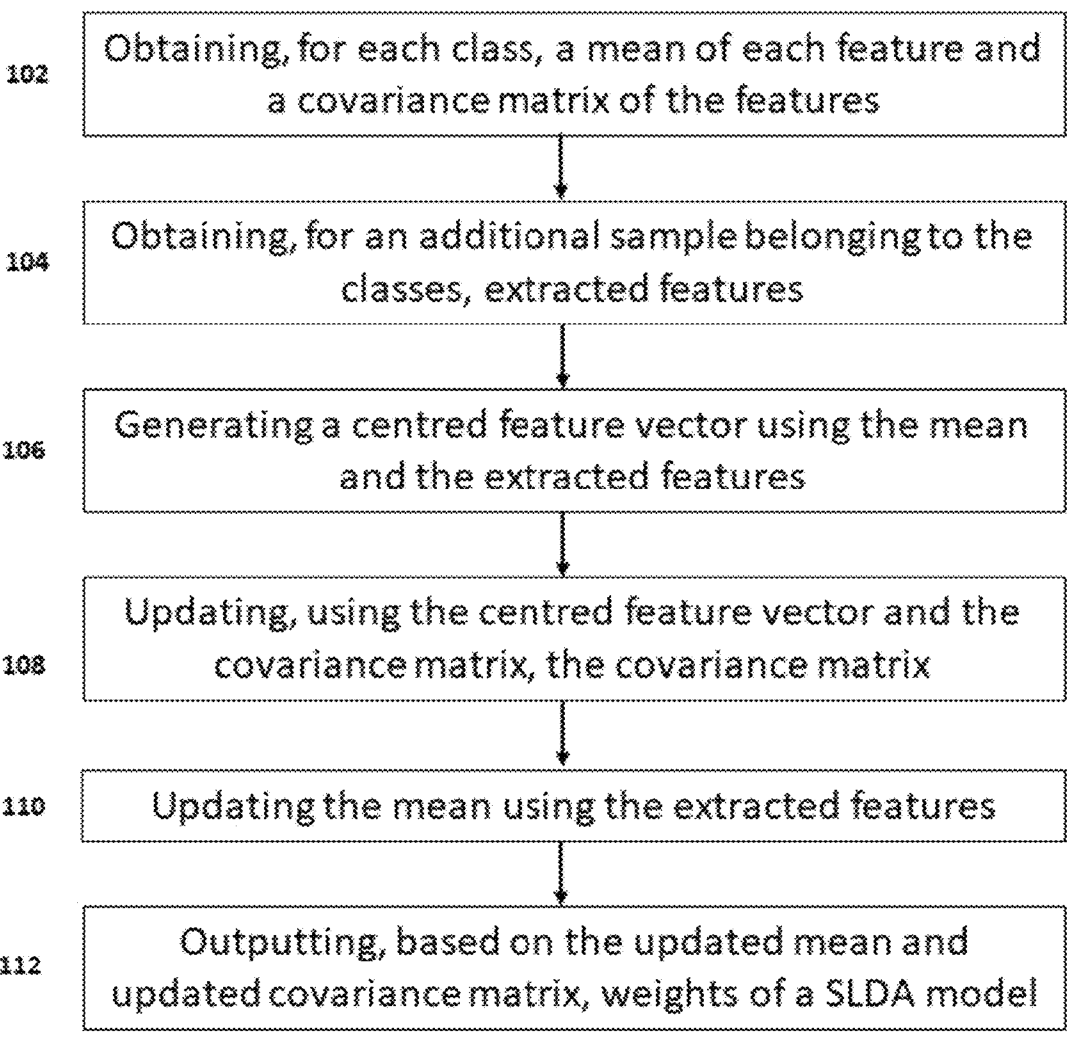
FIG. 1 illustrates an example high-level architecture of the proposed continual learning method.

Such a continual learning method 100 is exemplified in FIG. 1. The method 100 comprises:

Step 102: obtaining, for each of a plurality of classes, a mean of each of a plurality of features generated by passing a plurality of training samples to a pre-trained CNN, and a covariance matrix of the plurality of features, wherein each of the training samples belongs to one of the classes;

Step 104: obtaining extracted features from the pre-trained CNN for an additional training sample belonging to a class of said classes;

Step 106: generating a centred feature vector using the mean for the class and the extracted features;

Step 108: updating, using the centred feature vector and the covariance matrix, the covariance matrix;

Step 110: updating the mean for the class using the extracted features; and

Step 112: outputting, based on the updated mean and updated covariance matrix, weights of a streaming linear discriminant analysis (SLDA) model.

Figure 2:
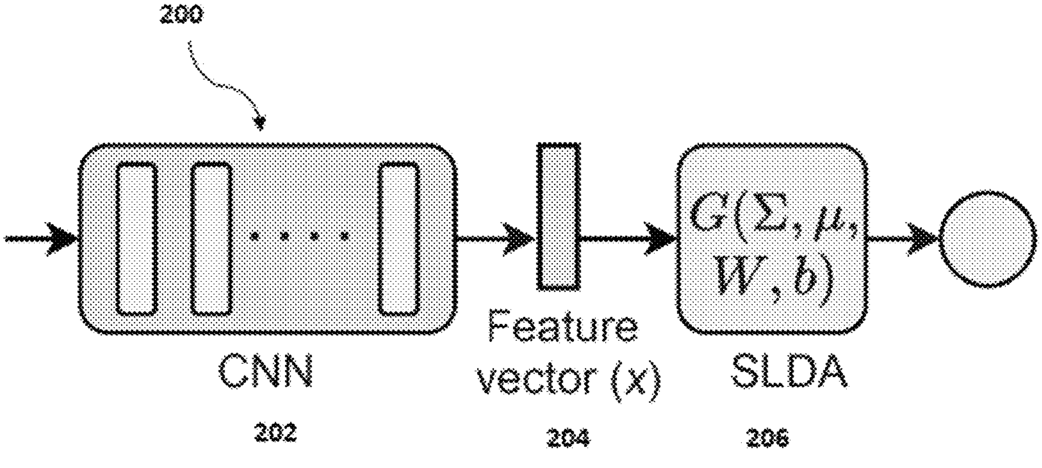
FIG. 2 illustrates an example SLDA model.

The continual learning model is based on the Deep SLDA model, which is illustrated in FIG. 2. The model achieves high accuracy, with high efficiency and scalability, which makes it amenable for resource constrained edge devices. The Deep SLDA model implements the method 100 by combining a CNN 202 as a feature extractor for extracting features 204 and the SLDA 206 as a classifier. The SLDA 206 replaces the last Fully-Connected (FC) layer. As new data is recorded, new classes may emerge. As the model learns these new classes, SLDA 206 incrementally adapts its parameters to add new knowledge. During adaptation the convolutional (CONV) layers remain frozen. SLDA 206 relies on the CONV layers of a CNN trained on a large dataset (e.g., Imagenet) to act as a generic feature extractor. The CNN employed for experimental purposes is the Resnet 18 CNN model pre-trained on Imagenet dataset, where features extracted from Avg Pool (dimension (D) 512), are fed into the SLDA 206.

The algorithm implemented by SLDA 206 is intended to learn the distribution of embedding feature space. Per step 110 of FIG. 1, this is achieved by updating the mean feature of each class (μ). This also involves updating a shared covariance matrix (Σ) during training (see Steps 108 of FIG. 1). During inference, features are classified by assigning them to the nearest classifier. The classifier may be a Gaussian. The classifier may take the form of a linear classifier (see Eq. (7)).

To achieve the above updating processes, the SLDA performs various computations as follows. During training, as a new input feature belonging to class $k(x_t \in \mathbb{R}^{D\times 1})$ arrives, $\mu(\in \mathbb{R}^{D\times N_c})$ and $\Sigma(\in \mathbb{R}^{D\times D})$ are updated as follows, $$z_t = x_t - \mu_k \quad (1)$$

$$\sum_{t+1} = \left(\frac{t}{t+1}\right)\cdot\left[\sum_t + \left(\frac{1}{t+1}\right)\cdot z_t \cdot z_t^T\right] \quad (2)$$

-continued $$\mu_{k,t+1} = \frac{[c_k \cdot \mu_{k,t} + x_t]}{(c_k + 1)} \tag{3}$$

Where $x_t$ is the $t^{th}$ embedding feature extracted by CNN (t is the total number of encountered samples over time), and could belong to either an already learnt class or a new class, D is the dimension of embedding feature extracted from CNN (it will be appreciated that covariance matrix has D×D dimensions), $N_c$ is the current number of classes, $z_t$ is the $t^{th}$ mean-centred feature, while $c_k$ is the number of encountered samples from class k. Notably, since the samples are taken at discrete time steps, the term "t" can be used interchangeably to refer to time, the number of the encountered training sample, or embedding feature extracted, at time step t, and so on. In the present context, an "encountered training sample" is a training sample seen at runtime as distinct from the training samples of the pre-trained CNN model. To derive the linear classifier for inference, μ and Σ are converted into weights ($W \in R^{D \times N_c}$) and bias ($b \in R^{1 \times N_c}$) as follows.

$$\Lambda = \left[(1-\epsilon) \cdot \sum + \epsilon \cdot I\right]^{-1} \tag{4}$$

$$W = \Lambda\mu \tag{5}$$

$$b = -0.5 \cdot (\mu \cdot W) \tag{6}$$

where ∈ is shrinkage parameter, and $I \in R^{D \times D}$ is the identity matrix. During inference, the classification is done as follows, $$\text{scores}_t = W^T x_t + b^T \tag{7}$$

$$\hat{y}_t = \text{argmax}(\text{scores}_t) \tag{8}$$

The SLDA can have multiple variants. In one variant, SLDAPlasticCov, the covariance gets updated for each training sample. In another variant, SLDAStaticCov, the covariance is initialized during a base initialization step and remains static throughout. The latter has lesser accuracy, but has comparatively extremely low computational and memory requirements. In some embodiments, only the diagonal elements of the covariance matrix are updated, but the off-diagonal elements are not updated. As illustrated in Step 108 in FIG. 1, the present invention proposes a new variant of SLDA, SLDADiagCov, which updates only the diagonal of the Σ in Eq. (2). In other words, SLDADiagCov, learns the variance in each dimension, and ignores the covariance among dimensions of the embedding feature space. This approximation leads to best-case memory savings of D·(D−1)/2 parameters, and savings of 3·(D−1)/2 multiplications and D·(D−1)/2 additions (Eq. (2)), compared to SLDAPlasticCov. Experimental results show that the SLDADiagCov provides a good accuracy/efficiency trade-off.

Figure 3:
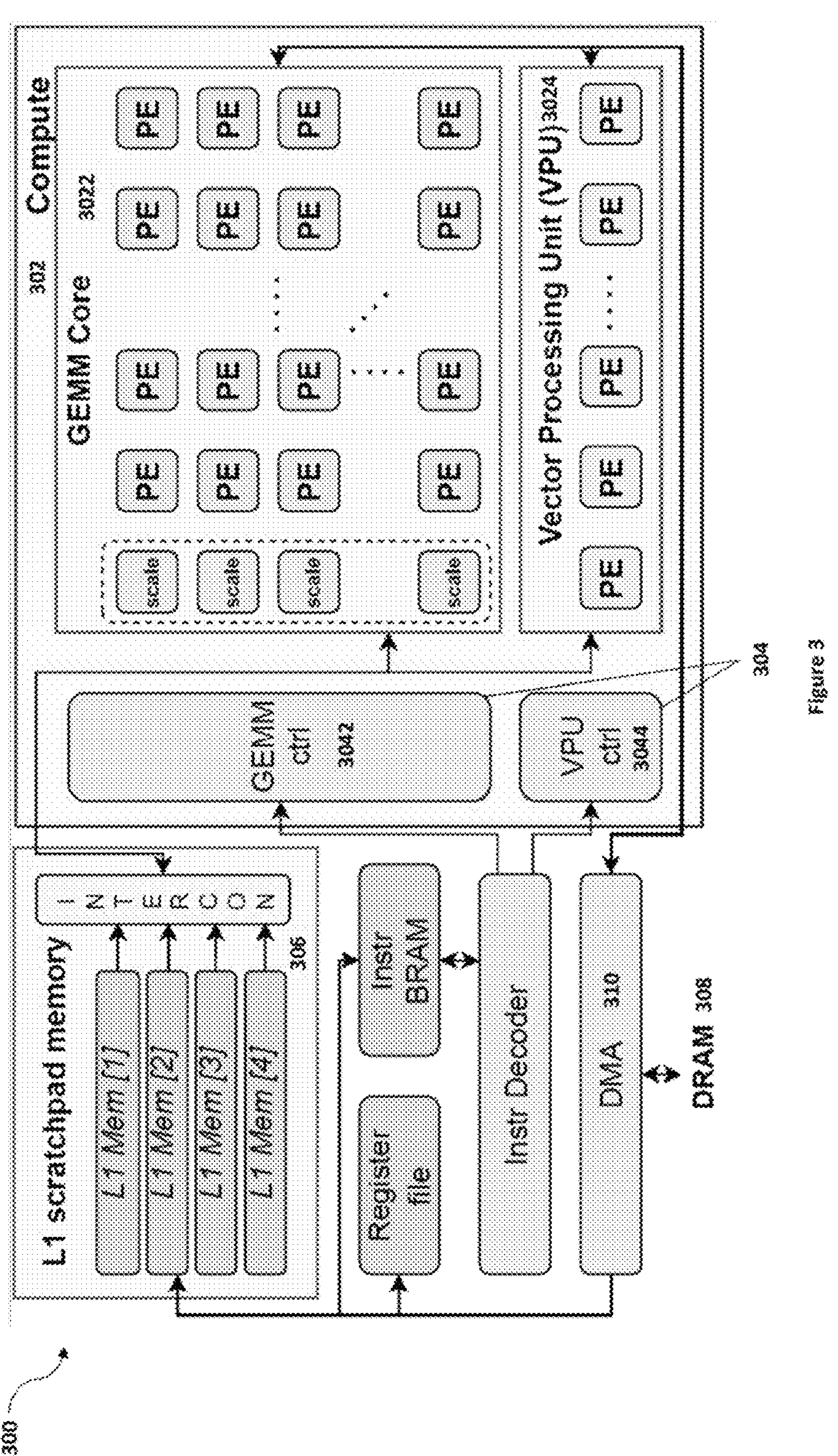
FIG. 3 illustrates a schematic diagram showing components of an hardware architecture for performing the methods described herein.

With reference to FIG. 3, an overview of the proposed hardware architecture 300 is illustrated. The architecture 300 includes a compute unit 302, a controller 304 and memory. The compute unit 302 supports matrix and vector computations. In particular, the computer unit 302 supports matrix and vector computations of SLDA variants. In some embodiments, the compute unit 302 contains a General Matrix Multiplication (GEMM) core 3022 for matrix operations. In some embodiments, the compute unit 302 contains a Vector processing unit (VPU) 3024 for vector operations. The controller contains a GEMM controller 3042 and a VPU controller 3044. The memory comprise off-chip and on-chip memory, or one of off-chip and on-chip memory. In the present embodiment, the memory comprises on-chip memory arranged in two levels (L1 306 and L2 (not shown in FIG. 3)). One level (L1 306) is for off-chip memory access buffering—presently embodied by DRAM 308. The other level (L2) is used for on-chip caching. The memory may be scratchpad memory. In some embodiments, the scratchpad memory comprises L1 scratchpad memory comprising a plurality of banks split into distinct BRAM units.

As mentioned above, the GEMM core 3022 supports general matrix multiply and accumulation as expressed in the form, $$C = k_1 \cdot A * B + k_2 \cdot C \tag{9}$$

where $k_1$, $k_2$ are scaling constants, and A, B, C are matrices.

The GEMM core 3022 implements the SLDA operations, by performing covariance update during training (Eq. (2)). The GEMM core 3022 may also label score calculation during inference (Eq. (7)). These two operations require support for vector outer product and accumulation, and matrix-vector multiplication respectively.

Figures 4A, 4B:
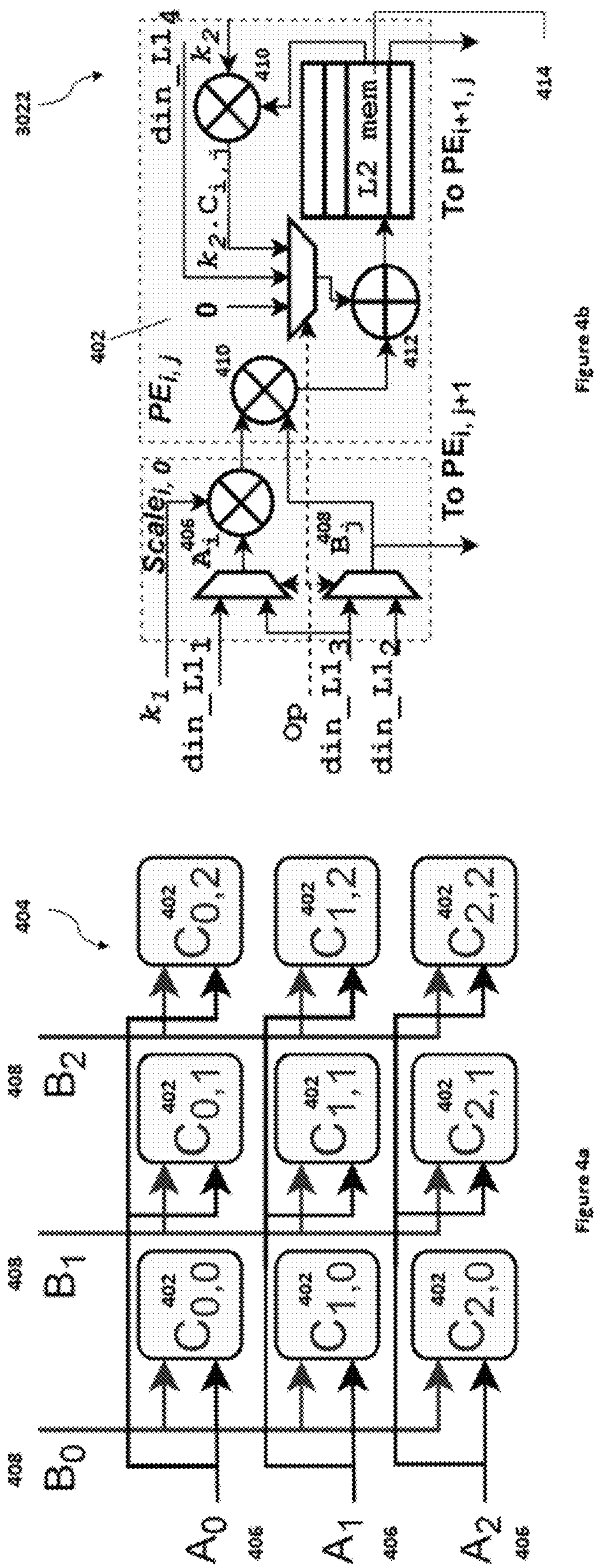
FIGS. 4*a* and 4*b* illustrate a schematic diagram showing dataflow and processing element of a GEMM core.

In some embodiments, the GEMM unit comprises an array of processing elements, and the GEMM unit is configurable to be flattened to a single column. As shown in FIG. 4*b*, the GEMM core 3022 consists of a T×T array of processing elements (PE) (see 402 in FIG. 4*b*). This allows the core to operate on one T×T matrix tile at a time. For matrices with dimensions larger than T, the hardware supports tiled operations. In such circumstances, the output tiles are computed sequentially as elaborated in Table 1, which illustrates GEMM core loop. The outer loop traverses over output tiles, while the inner loop describes the computations within a single tile. The matrix dimensions and shapes are run-time configurable via instructions. This provides the flexibility to support different types of matrix operations required for SLDA operations (Eq. (2) and (7)), and to support embedding features from different CNN backbone networks.

TABLE 1

```
//Tile outer loop (<D, D> : T_m = T_p = D/T)
for(int m=0; m<T_m; m++) {
 int p_start = (is_triangular)? m : 0;
 int p_end = (is_diagonal) ? m+1 : T_p;
 for(int p=p_start; p<p_end; p++) {
  for(int n=0; n<n1; n++) {
//Tile inner loop
    for(int i=0; i<n2; i++) {
     for(int j=0; j<T; j++) {
      #ifdef SLDA_PLASTIC_COV
       for(int k=0; k<T; k++) {
      #elif
       int k=j;
      #endif
      //[Processing Element logic]
```

The GEMM core 3022 follows output stationary (OS) dataflow, where each PE 402 accumulates a single element of the output tile, while the inputs A (see 406) and B (see 408) are broadcast into each PE 402 as shown in FIGS. 4*a* and 4*b*. The inputs are routed from L1 scratchpad memory 306, and can be switched between multiple banks via instruction control for flexibility. Each PE 402 may contain one or more than one multiplier, and an adder. Presently, each PE 402 contains two multipliers (410) and an adder (412) (see FIG. 4*b*). In relation to Eq. (9), the multipliers 410 perform input multiplication ($k_1 \cdot A_i * B_j$, i≤T, j≤T) and accumulation scaling ($k_2 * C_{i,j}$), where the VPU contains T processing elements. The adder 412 performs the product accumulation. The L2 scratchpad memory 414 inside the PE 402 facilitates multiple partial accumulations for future reuse, to minimize off-chip DRAM access.

Figure 5:
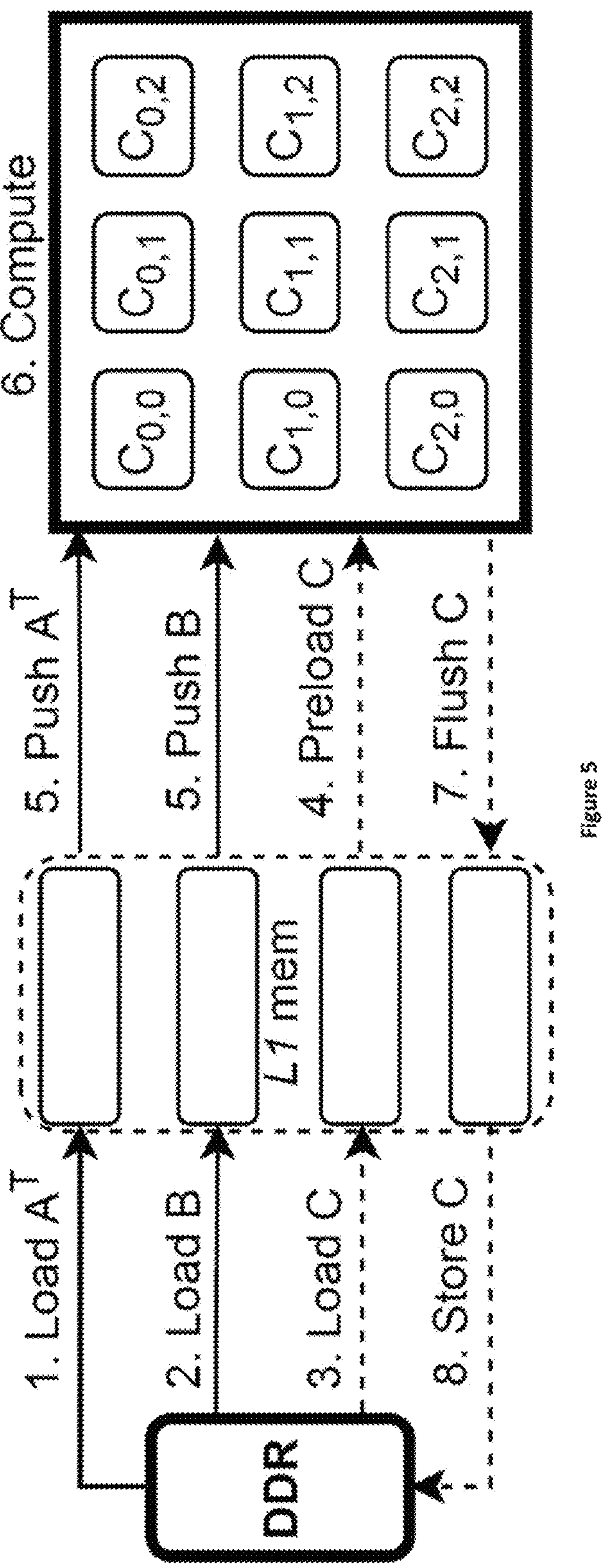
FIG. 5 illustrates GEMM core tile operation.

The operation of a single output matrix tile in GEMM core 3022 in the general case is shown in FIG. 5. The DRAM 308 accesses, pre-loading/flushing accumulations, shown in dotted lines are configurable during run-time and could be skipped to give better performance Details on how SLDA application-specific optimizations leverage this configurability of GEMM core 3022 will be described later.

The VPU 3024 performs elementwise vector addition, subtraction and scaling to support operations in Eq. (1) and (3). The VPU contains T processing elements, and utilizes tiled operations to support generic vector sizes as discussed above.

The GEMM 3022 and the VPU cores 3024 are controlled by an instruction set comprising of two high-level instructions GEMMOP (see 602 in FIG. 6*a*) and VECOP (see 604 in FIG. 6*b*) for the two cores respectively. The instructions specify a two level opcode (see 6022 and 6042), address modes (see 6024 and 6044), memory offsets (Reg (see 6062 and 6064), Scratchpad (see 6082 and 6084) and DRAM (see 6072 and 6074)) and control flags (see 6092 and 6094) to enable/disable input/accumulate and load/store operations. The instruction control provides the flexibility to reuse same resources for different operations (inference/training) by controlling the loop bounds to handle various matrix dimensions and shapes. The instruction control provides the flexibility to access different locations in DRAM, and switch between local scratchpad memory banks for data reuse. Moreover, the instruction set can enable/disable DRAM access for optimal performance The instructions are stored in a separate on-chip memory and during runtime. The instruction decoder can execute instructions according to a predetermined policy, such as executing instructions in order of receipt. To do this, instructions are converted into control signals and address information.

As discussed before, SLDA model has 3 phases of computation. These phases are a) Updating mean (μ) and covariance ((Σ)) for each train sample (see Eq. (1), (2) and (3)), b) Deriving inference weights (W) and bias (b) (see Eq. (4)-(6), and c) Running inference for each test sample (see Eq. (7) and (8)). Steps a) and c) can be accelerated on the proposed hardware architecture. Steps a) and c) may be performed sequentially. However, step b) is performed on the host (ARM PS on Zynq MPSoC).

Figure 7A:
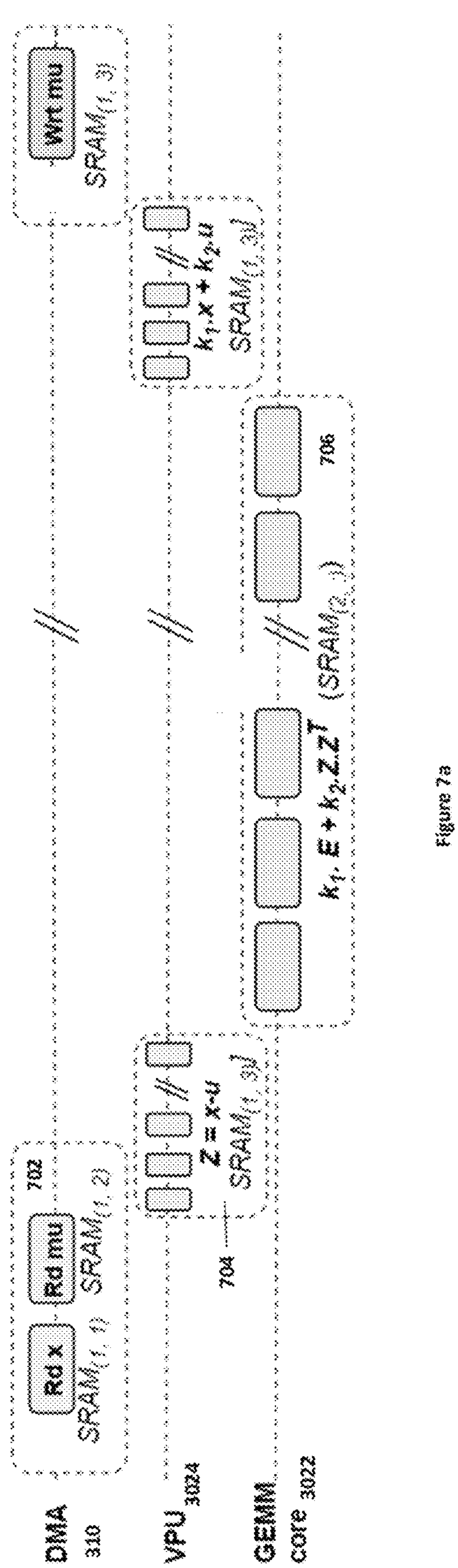
FIGS. 7*a* and 7*b* illustrate hardware execution of SLDA training steps per sample.

The execution steps of mean (μ) and covariance (Σ) updates (see Eq. (1), (2) and (3)) in the proposed hardware is shown in FIG. 7*a*. In SRAM[x, y], x refers to scratchpad memory level, y refers to the memory bank. The mean of the training sample class ($\mu_k$) and input feature vector (x) is read from DRAM 308 into L1 memory 306. The feature vector may be centred using the VPU 3024 (see Eq. (1), 702 in FIG. 7*a*). Centring allows the output to be used by the GEMM core 3022 to perform the Σ update (see Eq. (2), 704 in FIG. 7*a*). Finally, $\mu_k$ is updated and written to DRAM 308 via L1 memory (Eq. (3), 706 in FIG. 7*a*). For SLDAStaticCov, only the $\mu_k$ update is performed.

Figure 7B:
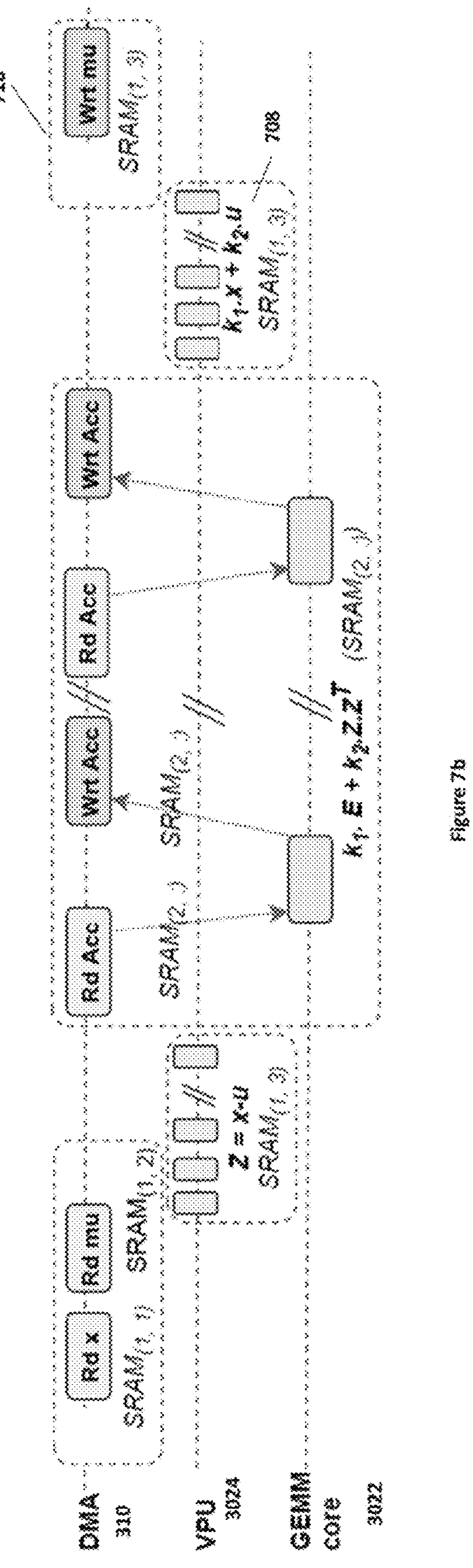
Figure 8:
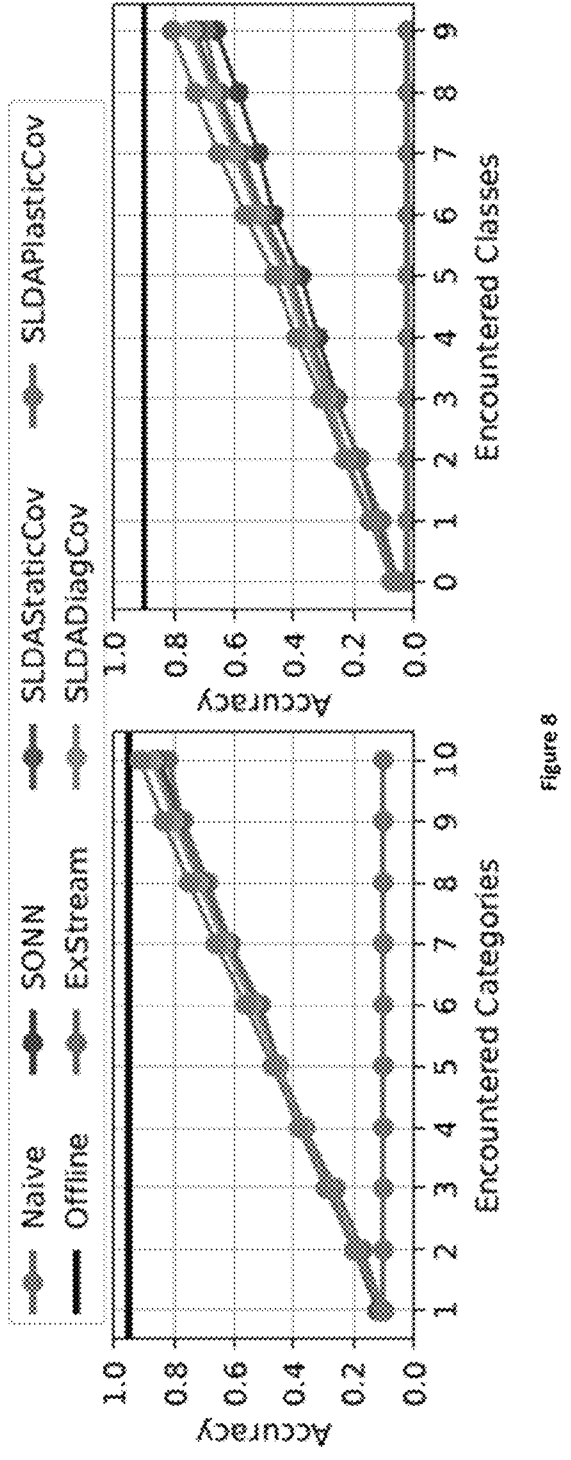
FIG. 8 illustrates experimental results of TOP-1 accuracy vs. encountered classes.
Figure 9:
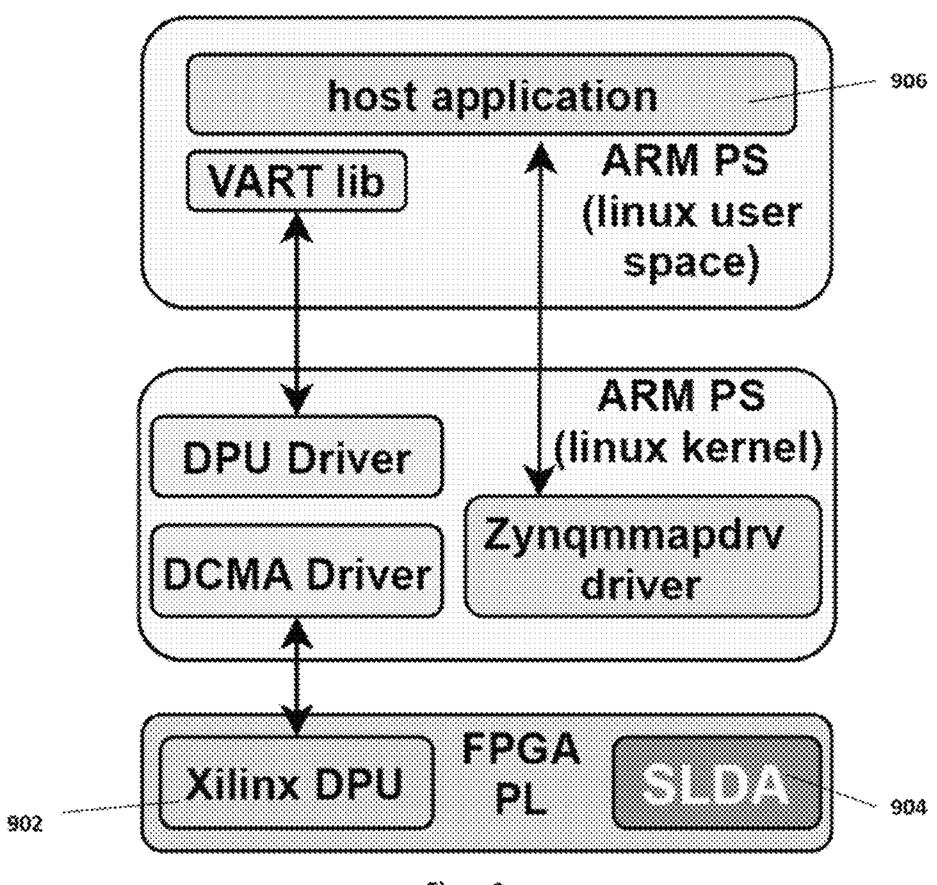
FIG. 9 illustrates a schematic diagram showing components of a platform for performing the methods described herein.

For the first sample of a training phase, covariance has to be loaded from memory (e.g. DRAM 308) to L2 memory. This occurs for each tile of computation. For the last sample of a training phase, the covariance has to be flushed back into DRAM (see FIG. 7*b*). This loading and flushing accumulation is controlled by instruction flags. At the beginning of an inference phase, the host computes the Weights (W) and Bias (b) (see Eq. (4) (see 708 in FIG. 7*b*), Eq. (5) (see 710 in FIG. 7*b*) and Eq. (6)). The bias is transferred from memory (e.g. DRAM) into L2 memory of the GEMM core. For each testing sample, input (x) and Weights (W) are loaded into the L1 memory from DRAM and the GEMM core computes matrix vector product (Eq. (7)) in a tiled approach. The final scores are transferred to host for label prediction (Eq. (8)).

Regarding tile skipping, the SLDA covariance (Σ) is a symmetric matrix. For SLDAPlasticCov, the present disclosure exploits this to compute only the upper triangular portion of Σ. This achieves compute and memory savings. The skipping is done at tile granularity. Thus, given Σ is of dimension D×D, this leads to a saving of on-chip storage and latency of operation in Eq. (2) by a factor of $T_D \cdot (T_D - 1)/2$, where $T_D = D/T$ (T is tile size).

In some embodiments, the memory is configured to store the mean, covariance matrix, and extracted features using a fixed-point data representation. Regarding fixed-point quantization, to achieve higher efficiency in the hardware design, the present invention adopts a fixed-point data representation scheme in place of floating-point for lower latency arithmetic, reduced resource, and power consumption.

Regarding the accuracy/efficiency trade off: for SLDADiagCov and SLDAStaticCov, the PE array (in GEMM core) may be flattened to a single column (Table 1: line 13). This is possible since only the diagonal of the PE array is utilized during SLDADiagCov training. Similarly, during inference only a single row is utilized across all variants. This pre-synthesis optimization results in removal of T·(T−1) GEMM core PEs, leading to resource and power savings.

Regarding scratchpad memory design, the scratchpad memory based on on-chip memory is used for buffering, and caching data and intermediate results to minimize off-chip memory access (e.g. DRAM access). This scratchpad memory is split into two levels (L1 and L2). and organized to maximize memory bandwidth to compute units.

The present disclosure starts with the L1 scratchpad memory. L1 memory acts as a buffer between DRAM and compute units and also for caching intermediate results. As shown in FIG. 3, the L1 memory is split into multiple banks with the flexibility to configure the input and output banks at instruction level. This allows sufficient on-chip caching opportunities. The banks are split into distinct units—presently BRAM units—to reduce multiplexing.

In some embodiments, the compute unit is configured to store the mean in a first bank of said plurality of banks. The compute unit may also be configured to store the extracted features in a second bank of said plurality of banks, during the generation of the centred feature vector. The compute unit may further, or alternatively, be configured to store the centred feature vector in a third bank of said plurality of banks. FIG. 6 shows the bank selection during each step of training The x and u loaded to bank 1 and 2 during Eq. (1) is reused for Eq. (3), while VPU output from step Eq. (1) stored in bank 3 is reused by GEMM core in Eq. (2). During inference, GEMM core uses bank 1 and 2 for w and x, while output is written to DRAM via bank 4.

Figures 6A, 6B:
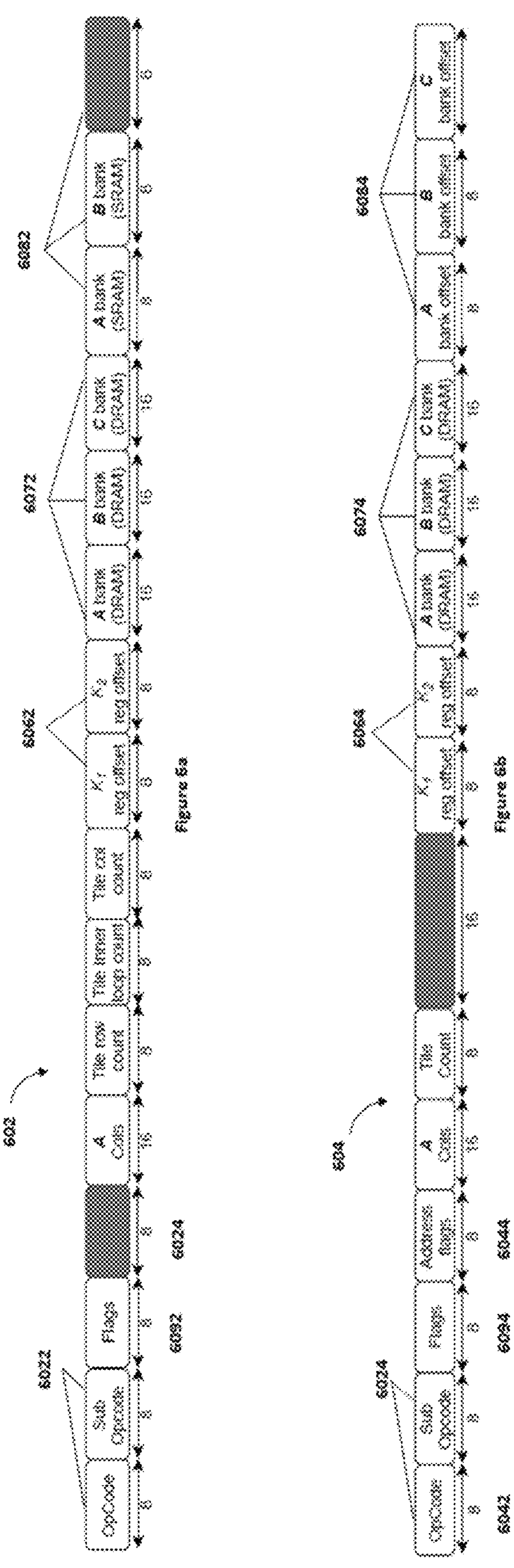
FIGS. 6*a* and 6*b* illustrate GEMMOP and VECOP instruction format, respectively.

In some embodiments, the GEMM unit comprises L2 scratchpad memory associated with each of said processing elements. The L2 memory stores elements of at least part of said covariance matrix. L2 memory is distributed across PEs in the GEMM core and is used for caching accumulations for reuse. During training, memory unit of each PE stores overlapping elements of covariance tiles Similarly during inference, overlapping bias elements are stored in each PE. This eliminates the need for accumulator flushing and reading to and from the DRAM between two output tiles as shown in FIG. 6*b*). This leads to significant latency savings.

Experimentally, the continual learning models prevented forgetting to various degrees. All SLDA variants outperformed baseline continual learning models, with SLDAPlasticCov displaying the highest accuracy. In contrast, the proposed SLDADiagCov and SLDAStaticCov exhibited the highest efficiency. Additionally, all SLDA variants are extremely scalable—learning a new class only increased memory consumption by 4 KB, and had no impact on training latency. The high efficiency and scalability makes SLDA more amenable for edge implementation. While SLDAPlasticCov is the best choice for applications with high accuracy requirements, the proposed SLDADiagCov can be used as an alternative in resource-constrained devices deployed in applications where accuracy is not a critical requirement.

The optimal fixed-point representation of inputs/parameters was identified by a sensitivity analysis. A mixed-precision fixed-point design was found to be necessary to achieve the most efficient and accurate hardware design.

In a fixed-point design, at least 40% of DSP and FF and 30% LUT savings were achieved across all variants. For SLDAPlasticCov, the latency and power reduce approximately by 60% and 20% respectively. No corresponding power reduction was observed for SLDADiagCov and SLDAStaticCov. This is due to their already low resource utilization and compute complexity. In a fixed-point implementation the proposed SLDADiagCov was equivalent to SLDAStaticCov in terms of hardware resources and power while being more accurate.

In experimentation, FPGA significantly outperformed GPU across all SLDA variants, and ARM CPU for SLDAPlasticCov and SLDADiagCov, in terms of both latency and energy. This is a result of the application-specific parallelism and pipelining in the PEs, custom memory organization for optimal data access and the mixed-precision arithmetic units. This demonstrates the proposed FPGA accelerator is a better choice for continual learning at the edge compared to the CPU and GPU counterparts.

The proposed accelerator enables on-device continual learning for edge vision applications operating in dynamic environments at the edge, with real-time requirements and stringent power constraints. The potential applications areas include mobile robots used in commercial and industrial settings, aerial drones used for surveillance and inspection, traffic surveillance systems, autonomous driving systems, and security camera systems, where CNNs are increasingly used for object recognition in dynamic environments in which new objects or different variations of known objects are continuously encountered. The on-device streaming learning capability of the proposed accelerator provides faster learning capability while ensuring data privacy as raw data is neither shared with a remote server nor stored at the edge device. Also, this allows the above applications to minimize, if not avoid the network communication bandwidth requirements. The overhead incurred for continual learning in terms of latency and energy in the accelerator is minimal in comparison to normal inference functioning mode. Additionally, the streaming learning nature allows the training to be done on the fly (during normal inference functioning), without the need for a separate offline training phase.

In general, the present hardware and software schema proposed an FPGA edge accelerator for continual learning based on SLDA. Custom optimization strategies were introduced that led to significant savings in latency, resource, and power consumption. A novel SLDA variant was proposed to achieve good hardware efficiency with accuracy trade-offs. Additionally, empirically the proposed accelerator is able to be combined with a CNN accelerator for on-chip full continual learning with high computational and energy efficiency.

As a result of the foregoing, an on-chip system is disclosed for continual learning. The on-chip system comprises memory and at least one compute unit in communication with the memory. The at least one compute unit is configured to:

obtain, for each of a plurality of classes, a mean of each of a plurality of features generated by passing a plurality of training samples to a pre-trained CNN, and a covariance matrix of the plurality of features, wherein each of the training samples belongs to one of the classes;

obtain extracted features from the pre-trained CNN for an additional training sample belonging to a class of said classes;

generate a centred feature vector using the mean for the class and the extracted features;

update, using the centred feature vector and the covariance matrix, the covariance matrix;

update the mean for the class using the extracted features; and output, based on the updated mean and updated covariance matrix, weights of a SLDA model.

Figure 10:
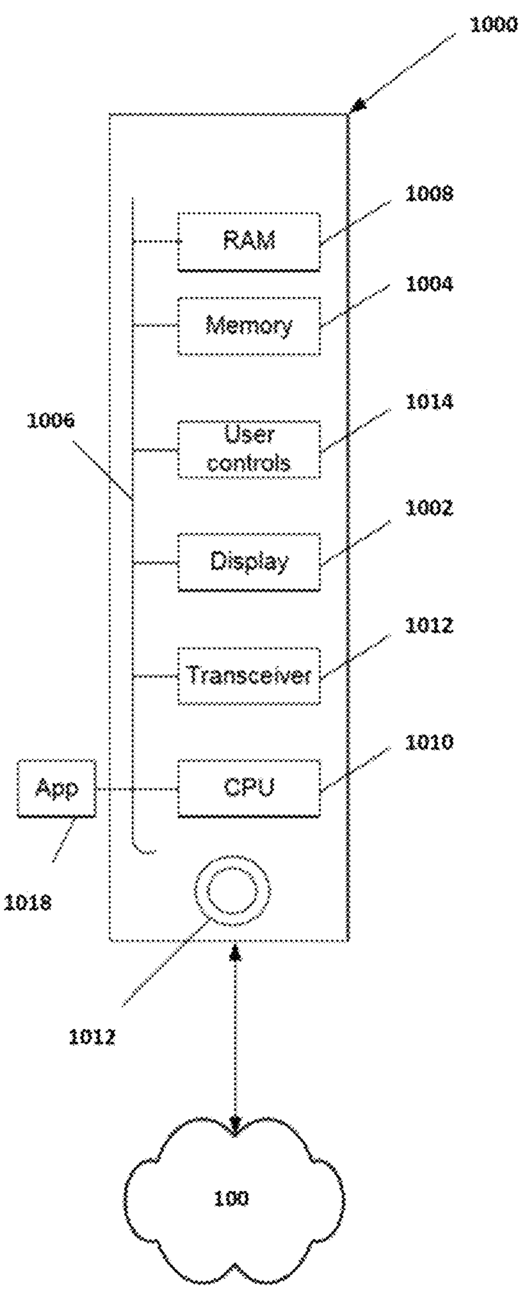
FIG. 10 is a schematic diagram showing components of an exemplary computer system for performing the methods described herein.

FIG. 10 is a block diagram showing an exemplary computer device 1000, in which embodiments of the invention may be practiced. The computer device 1000 may be a mobile computer device such as a smart phone, a wearable device, a palm-top computer, and multimedia Internet enabled cellular telephones when used in training the model, and, for use in controlling a vehicle or other machine for autonomous driving, may be an on-board computing system or a mobile device such as an iPhone™ manufactured by Apple™, Inc or one manufactured by LG™, HTC™ and Samsung™, for example, or other device in communication with the vehicle or other machine and configured to send control commands thereto and to receive information on human interventions from the vehicle or other machine.

As shown, the mobile computer device 1000 includes the following components in electronic communication via a bus 1006:

(a) a display 1002;

(b) non-volatile (non-transitory) memory 1004;

(c) random access memory ("RAM") 1008;

(d) N processing components (referenced as CPU 1010), which may include the compute unit such that processes performed by the compute unit are executed by the N processing components;

(e) a transceiver component 1012 that includes N transceivers; and user controls 1014.

Although the components depicted in FIG. 10 represent physical components, FIG. 10 is not intended to be a hardware diagram. Thus, many of the components depicted in FIG. 10 may be realized by common constructs or distributed among additional physical components. Moreover, it is certainly contemplated that other existing and yet-to-be developed physical components and architectures may be utilized to implement the functional components described with reference to FIG. 10.

The display 1002 generally operates to provide a presentation of content to a user, and may be realized by any of a variety of displays (e.g., CRT, LCD, HDMI, micro-projector and OLED displays).

In general, the non-volatile data storage 1004 (also referred to as non-volatile memory) functions to store (e.g., persistently store) data and executable code. The system architecture may be implemented in memory 1004, or by instructions stored in memory 1004.

In some embodiments for example, the non-volatile memory 1004 includes bootloader code, modem software, operating system code, file system code, and code to facilitate the implementation components, well known to those of ordinary skill in the art, which are not depicted nor described for simplicity.

In many implementations, the non-volatile memory 1004 is realized by flash memory (e.g., NAND or ONENAND memory), but it is certainly contemplated that other memory types may be utilized as well, such as DRAM, BRAM, and multi-level implementations for scratchpad memory, and may include on-chip and/or off-chip memory. Although it may be possible to execute the code from the non-volatile memory 1004, the executable code in the non-volatile memory 1004 is typically loaded into RAM 1008 and executed by one or more of the N processing components 1010.

The N processing components 1010 in connection with memory 1008 generally operate to execute the instructions stored in non-volatile memory 1004. As one of ordinarily skill in the art will appreciate, the N processing components 1010 may include a video processor, modem processor, DSP, graphics processing unit (GPU), and other processing components. The N processing components may comprise the compute unit and therefore include the general matrix multiplication core, VPU and/or other components depending on the particular implementation.

The transceiver component 1012 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

The system 1000 of FIG. 10 may be connected to any appliance 418, such as one or more cameras mounted to the vehicle, a speedometer, a weather service for updating local context, or an external database from which context can be acquired.

It should be recognized that FIG. 10 is merely exemplary and in one or more exemplary embodiments, the functions described herein may be implemented in hardware, software, firmware, or any combination thereof, but do not encompass a full software implementation. If implemented in software, the functions may be stored on or transmitted over as one or more instructions or code encoded on a non-transitory computer-readable medium 1004. Non-transitory computer-readable medium 1004 includes both computer storage medium and communication medium including any medium that facilitates transfer of a computer program from one place to another. A storage medium may be any available medium that can be accessed by a computer.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. An on-chip system for continual learning, comprising memory and at least one compute unit in communication with the memory, the at least one compute unit being configured to:

obtain, for each of a plurality of classes, a mean of each of a plurality of features generated by passing a plurality of training samples to a pre-trained convolutional neural network, and a covariance matrix of the plurality of features, wherein each of the training samples belongs to one of the classes;

obtain extracted features from the pre-trained convolutional neural network for an additional training sample belonging to a class of said classes;

generate a centered feature vector using the mean for the class and the extracted features;

update, using the centered feature vector and the covariance matrix, the covariance matrix only diagonal elements of the covariance matrix and not off-diagonal elements of the covariance matrix;

update the mean for the class using the extracted features; and output, based on the updated mean and updated covariance matrix, weights of a streaming linear discriminant analysis (SLDA) model, wherein the at least one compute unit is an FPGA comprising a general matrix multiplication (GEMM) unit in communication with a vector processing unit (VPU), wherein the memory is configured to store the mean, the covariance matrix, and the extracted features using a fixed-point data representation, wherein generation of the centered feature vector and updating of the mean are carried out by the VPU, and wherein updating of the covariance matrix is carried out by the GEMM unit.

2. The system according to claim 1, wherein the GEMM unit comprises an array of processing elements; and wherein the GEMM unit is configurable to be flattened to a single column.

3. The system according to claim 1, wherein the memory comprises scratchpad memory for storing the extracted features, the mean, and the weights.

4. The system according to claim 3, wherein the scratchpad memory comprises L1 scratchpad memory comprising a plurality of banks split into distinct BRAM units.

5. The system according to claim 4, wherein the compute unit is configured to store the mean in a first bank of said plurality of banks, and the extracted features in a second bank of said plurality of banks, during the generation of the centered feature vector; and to store the centered feature vector in a third bank of said plurality of banks.

6. The system according to claim 3, wherein the memory is configured to store the mean, covariance matrix, and extracted features using a fixed-point data representation and the GEMM unit comprises L2 scratchpad memory associated with each of said processing elements, for storing elements of at least part of said covariance matrix.

7. A continual learning method, at least partly implemented in a FPGA device comprising a general matrix multiplication (GEMM) unit in communication with a vector processing unit (VPU), comprising:

- obtaining, for each of a plurality of classes, a mean of each of a plurality of features generated by passing a plurality of training samples to a pre-trained convolutional neural network, and a covariance matrix of the plurality of features, wherein each of the training samples belongs to one of the classes;
- storing the mean, covariance matrix, and extracted features using a fixed-point data representation;
- obtaining extracted features from the pre-trained convolutional neural network for an additional training sample belonging to a class of said classes;
- generating, by the VPU, a centered feature vector using the mean for the class and the extracted features;
- updating, by the GEMM using the centered feature vector and the covariance matrix, the covariance matrix, wherein said updating is performed for diagonal elements of the covariance matrix but not for off-diagonal elements;
- updating, by the VPU, the mean for the class using the extracted features; and
- outputting, based on the updated mean and updated covariance matrix, weights of a streaming linear discriminant analysis (SLDA) model.

8. The continual learning method according to claim 7, wherein the GEMM unit comprises an array of processing elements; and wherein the method comprises configuring the array of processing elements to be flattened to a single column.

9. The continual learning method according to claim 7, wherein the method comprises storing the extracted features, the mean, and the weights in scratchpad memory.

10. The continual learning method according to claim 9, wherein the scratchpad memory comprises L1 scratchpad memory comprising a plurality of banks split into distinct BRAM units.

11. The continual learning method according to claim 10, comprising storing the mean in a first bank of said plurality of banks, and the extracted features in a second bank of said plurality of banks, during the generation of the centered feature vector; and storing the centered feature vector in a third bank of said plurality of banks.

12. The continual learning method according to claim 9, wherein the method is at least partly implemented in a FPGA device comprising a general matrix multiplication (GEMM) unit in communication with a vector processing unit (VPU) and the GEMM unit comprises L2 scratchpad memory associated with each of said processing elements, for storing elements of at least part of said covariance matrix.

* * * * *